Nov. 3, 1959 C. F. SPITZER ET AL 2,911,484
ELECTRO-ACOUSTIC TRANSDUCER
Filed June 28, 1954 3 Sheets-Sheet 1

INVENTORS:
CHARLES F. SPITZER,
CHARLES A. ROSEN,

BY *George V. Eltgroth*
THEIR ATTORNEY.

Nov. 3, 1959 — C. F. SPITZER ET AL — 2,911,484
ELECTRO-ACOUSTIC TRANSDUCER
Filed June 28, 1954 — 3 Sheets-Sheet 2

INVENTORS:
CHARLES F. SPITZER,
CHARLES A. ROSEN,

BY *George V. Eltgroth*
THEIR ATTORNEY.

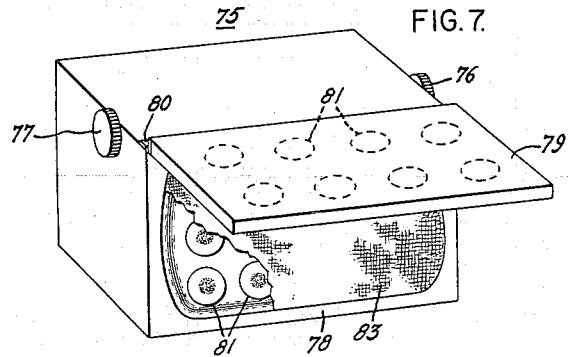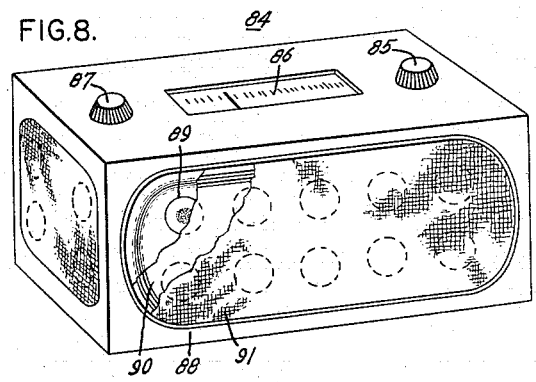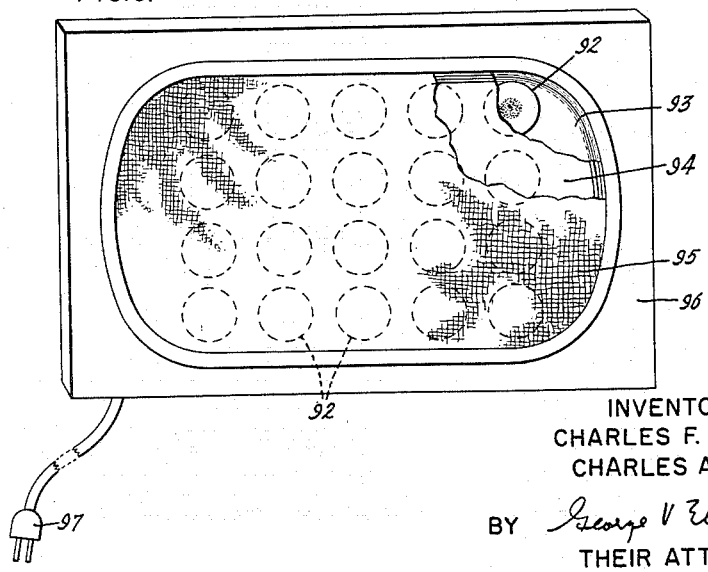

United States Patent Office 2,911,484
Patented Nov. 3, 1959

2,911,484

ELECTRO-ACOUSTIC TRANSDUCER

Charles F. Spitzer, Syracuse, and Charles A. Rosen, East Syracuse, N.Y., assignors to General Electric Company, a corporation of New York Application June 28, 1954, Serial No. 439,538

11 Claims. (Cl. 179—110)

The present invention relates to electro-acoustic transducers and has as an object thereof the provision of an improved sound reproducer.

The sound reproducer of the present invention produces acoustic energy by use of the inverse piezoelectric property. The inverse piezoelectric property is the property possessed by most piezoelectric materials of experiencing a strain in the presence of an electric field. Accordingly, piezoelectric electro-acoustic transducers contain a piezoelectric member in which an electric field may be established by an impressed periodic electric potential. Suitable electrodes are applied to the piezoelectric member for this purpose. Establishment of the periodic field is accompanied by a periodic strain in the piezoelectric member. The periodic strain is then translated into a net periodic translation of a surface, which is coupled to the surrounding air mass in which it occasions the periodic compressions and rarefactions characteristic of acoustic energy.

The transformation of electrical energy to acoustic energy in practical competitive devices by a piezoelectric transformation has hitherto been fraught with serious problems. A prime essential of an efficient acoustic generator is that it have an adequately large area, and that the range of displacement of the generator "piston" be adequately large. In the production of acoustic energy through the audible ranges, it may be noted that the lower frequencies require pistons of greater area, assuming a fixed range of displacement, to occasion the production of acoustic energy of a given intensity. Similarly, assuming a fixed piston area, to develop acoustic energy of a given intensity, a larger amount of piston displacement is required at the lower frequencies. These requirements have generally ruled out the use of piezoelectric drivers for the lower audible frequencies because of their limited displacements and their limited "piston" areas.

A second factor which has prevented the use of piezoelectric transducers is the fact that the piezoelectric drivers previously employed have been extremely difficult to fabricate and hence costly or required large quantities of relatively expensive materials. Rochelle salt is one material tried, but because of its humidity sensitivity it has been found to be impractical without expensive sealing. Quartz, on the other hand, is relatively insensitive to weather conditions but has such a limited usable elastic range that costly thin layered constructions are required to obtain a suitable range of deformation. If a single continuous crystal is employed operating in longitudinal vibration, considerable quantities of quartz are required.

In accordance with the present invention, means are disclosed for providing substantial increases in the effective piston areas and displacements in a piezoelectric sound reproducer. Furthermore, a piezoelectric driver of simple inexpensive design is disclosed.

The piezoelectric transducer of the present invention has further advantages over current magnetic loudspeakers in situations where space and weight are at a premium. The common magnetic loudspeaker of today requires considerable space behind the mounting panel to accommodate the conical diaphragm, which must be conical to preserve its rigidity, space to accommodate the conical framing which supports the diaphragm, and finally space to accommodate the driving assembly usually oriented behind the apex of the cone of the diaphragm. All of these spacial requirements in a magnetic loudspeaker may be substantially eliminated in the subject piezoelectric electro-acoustic transducer.

Accordingly, it is another object of the present invention to provide an improved piezoelectric sound reproducer.

It is a further object of the present invention to provide an improved piezoelectric sound reproducer in which the low frequency response is enhanced.

It is still another object of the present invention to provide an improved transducer element suitable for use in a piezoelectric sound reproducer.

It is another object of the present invention to provide a sound reproducer having a minimum depth.

It is an object of the present invention to provide an improved piezoelectric sound reproducer in which the high frequency components are projected through a wide angle.

These and other objects are achieved in a novel sound reproducer employing a plurality of thin piezoelectric members which are adapted to vibrate in a fundamental flexural mode. The piezoelectric members are preferably supported at a region which may be termed an antinodal region, so that the net effect of the surface flexure is to cause all other major exposed surfaces of the member to be translated in the same direction. The piezoelectric members may be of ceramic ferro-electric material such as barium titanate polarized to operate either in simple "bender" type coupling or in "twister" type coupling or in a combination of the two. The members may be arranged on a plate-like support upon which they may be used to drive the adjacent air mass either directly, or through the agency of a common diaphragm coupled at the region of the member experiencing the greatest translation.

Spacial economy is achieved by this construction, in that the supporting plate, the thin disks, and the diaphragm may all be arranged in parallel or laminal relationship, and hence require little depth. Further saving in cost and space is achieved by the consolidation of the supporting member of the sound reproducer with wall of the cabinet for the signal amplifying equipment.

Reduced high frequency radiation directivity is achieved by graded power energization, or by arrangement of the radiating elements over a convex surface.

The features of this invention which are believed to be novel are set forth with particularity in the appended claims. The invention itself, however, both as to its organization and method of operation, together with further objects and advantages thereof, may best be understood by reference to the following description when taken in connection with the following drawings wherein:

Fig. 7 shows an arrangement in which a sound reproducer is advantageously combined with a cabinet for enclosing signal amplifying equipment;

Fig. 8 is a further embodiment according to the present invention in which a reproducer is advantageously combined with a cabinet for signal amplifying equipment in such a manner as to provide improved high frequency dispersion; and Fig. 9 shows an embodiment of the invention suitable for wall mounting in isolation from the signal amplifying equipment.

Figure 1:
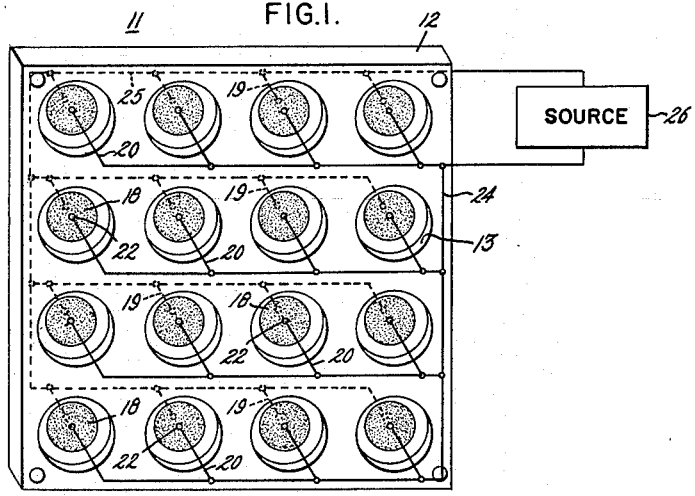
Fig. 1 shows in perspective a sound reproducer according to the present invention.
Figure 2:
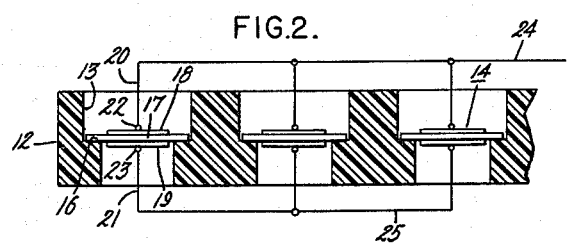
Fig. 2 shows a section of the sound reproducer illustrated in Fig. 1.

Referring now to Figs. 1 and 2, there is shown a reproducer unit embodying the present invention. In Fig. 1 a complete reproducer unit, illustrated in perspective, is shown, while in Fig. 2 a section view of a portion thereof is shown. The reproducer unit 11 comprises a flat, relatively thin, rigid support 12 of rectangular configuration. The support is of plastic material although other structural materials may be used. The support 12 is provided with a plurality of uniformly spaced circular recesses 13 in each of which a transducer element 14 is fitted. Non-uniform spacing may also be used where resonance problems require. The recess 13, which extends completely through the support 12, has a portion 15 reduced in diameter so as to provide a seat 16 for supporting the transducer element 14. The transducer element 14 is cemented about its periphery to the seat 16. The transducer 14 consists of a body portion 17 of thin disc or plate-like shape, formed of a ceramic ferro-electric material such as barium titanate. To enhance its compliance, the thickness is on the order of 0.005 inch. The piezoelectric properties of the body 17 will be discussed hereafter. Electrodes 18 and 19 are applied to the major surfaces of the body 17. The electrodes are formed of a thin layer of silver coated upon the major surfaces of the disc, and they may cover the entire surface, or a lesser portion thereof. It should be appreciated that for convenience in illustration, the thickness of the body portion 17 and the electrodes are enlarged out of proportion to their other dimensions. Other known conductive coatings with low acoustic loss may also be used. Electrical connection to the transducer 14 is effected by means of fine wires 20 and 21 connected respectively to the electrodes 18 and 19 at junctions 22 and 23. The junctions 22 and 23 may be small drops of solder into which the leads are placed.

Referring now more particularly to Fig. 1, the overall mode of connection of the transducer elements 14 may be seen. The leads 20, from each of the transducer elements 14, are joined to a bus 24. The leads 21 connected to the surfaces of the transducer elements 14 which are hidden in Fig. 1, are in turn connected to bus 25, shown as a dotted line in Fig. 1. The busses 24 and 25 may then be used for connection to a suitable source 26 of electric signals, such as the output amplifier stage of a radio receiver. As connected in Fig. 1, the unit has a nominal impedance of approximately 100 ohms, a value eminently suited for transistor output connection. The individual transducer elements 14 present an impedance of approximately 1600 ohms so that 16 such elements connected in parallel would have this impedance. Use of series connections and series-parallel connections between the transducer elements, makes it possible however to obtain a large range of impedances, obviating the need for an output transformer in many applications. This factor makes the reproducer of particular utility in applications where circuit simplicity and compactness is at a premium.

The operation of the reproducer unit 11 as a whole may now be considered. The source 26 supplies signal voltages of audio frequency to the busses 24 and 25. The busses 24 and 25 supply these voltages through leads 20 and 21 respectively to the junctions 22 and 23 of the electrodes 18 and 19 respectively. Application of the signal voltages at the electrodes 18 and 19 causes displacement of the piezoelectric body 17 in accordance with the amplitude of the applied signals.

The vibration of the piezoelectric body 17 is essentially non-resonant throughout the range of impressed frequencies and is in a mode which will be termed the fundamental spherical mode. In this mode, the body 17 passes through successive stages of varying approximately spherical curvatures. If the disk is originally flat as illustrated in Fig. 1, the curvature of the body 17 will be alternately positive and negative. The mode of support in which the entire periphery of the disk 17 is constrained while the center is relatively free to vibrate favors this type of vibration. The presence of centrally placed terminals of substantial mass, and the reduction in the thickness of the piezoelectric body 17 which increases its compliance to axial deformation, also help facilitate this type of motion. The effect of vibration in this manner is to cause a net displacement of the air at the surface of the transducer element 14 as it vibrates, so as to project acoustic energy from the surface of the body 17. The presence of a plurality of transducer elements 14, operating in phase increases the total "piston" area, and tends to increase the intensity of radiation at lower frequencies. The utilization of elements having a flexural mode of vibration makes it possible to achieve a much greater maximum displacement with a given depth of material than could be achieved by the use of members vibrating in simple linear extension modes, and at the same time requires lesser quantities of ceramic ferro-electric materials.

Electrical excitation of spherical vibrations may occur in several ways. The invention is not to be limited however to any single mechanism of establishing spherical vibrations and those which are noted below are merely exemplary.

One way in which spherical vibrations may be excited is by use of a piezoelectric body in which the polarization is varied as one proceeds along the thickness dimension of the piezoelectric body. The polarization, in this case, should be parallel to the thickness dimension of the piezoelectric body and parallel to the electric field established by the electrodes on the major surfaces of the body. The variation in polarization may take the form of having the region near one electrode strongly polarized in one direction, while the region near the other electrode is polarized in an opposite direction, or polarized to a lesser degree in the same direction. When an electric field of proper sign is established in the body parallel to the axes of polarization of the regions, the first region, of one polarity, will experience a major contraction in the direction of application of the field while the second region is experiencing a diminished contraction or a net expansion. Due to Poisson coupling of the thicknesswise strain, the transverse dimension of the first region will simultaneously experience an extension. Similarly, the transverse dimension of the second region will either experience a reduced transverse extension or a net contraction. The simultaneous contraction and extension of the two regions then tends to bend the member or cause a flexure. If the member is circular, the flexure may take the form of a spherical type of deformation. Application S. N. 154,957, filed April 10, 1950, in the name of Warren Samsel discloses a method of producing two layers of effectively dissimilar polarization in a thin ferroelectric member.

A second way of achieving a spherical deformation is by polarizing the transducer element with a substantial radial component, so that the polarization vector has a component transverse to the field exerted by the electrodes applied at the major surfaces of the body. When the electric field is then applied, the material tends to shear, the material being elongated in a direction along the vector sum of the electric field vector and the polarization vector, also producing a net spherical deformation.

The two kinds of deformation action discussed above are termed respectively "bender" and "twister" action in the art. Utilization of either one or both of the above actions makes it possible to achieve a substantial translation in an axial direction of the geometric center of the body with respect to its periphery. The latter appears to be particularly advantageous. Ferro-electric material is particularly suitable when it is desired to establish deflections in such a spherical mode, since the material may be shaped into extremely thin compliant configurations at little cost and then polarized as desired.

Figure 3:
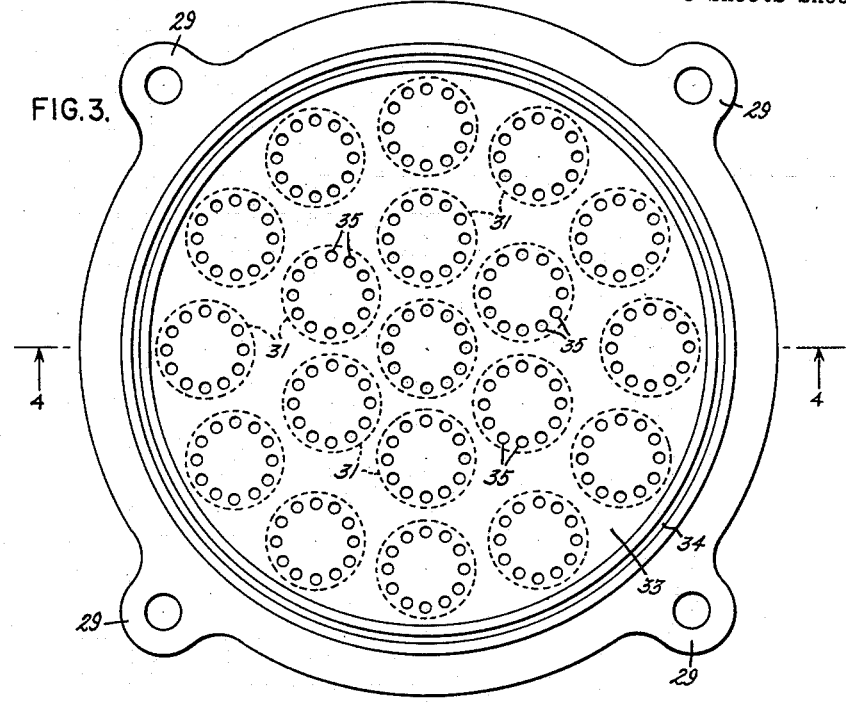
Fig. 3 shows a plan view of a sound reproducer according to the present invention, having further enhanced low frequency response.
Figure 4:
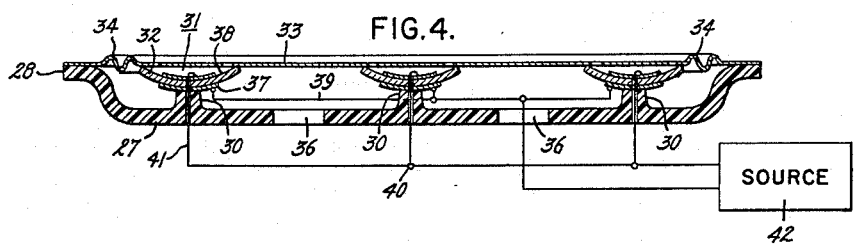
Fig. 4 shows a section of the sound reproducer illustrated in Fig. 3.

The arrangement shown in Figs. 1 and 2 is of particular advantage when high audio frequency operation is desired and is capable of producing appreciable energy from 500 cycles and above. Somewhat better low frequency response in a configuration of the same depth and overall area can be obtained by utilization of a common diaphragm. Figs. 3 and 4 show a reproducer of slightly different design in which a common diaphragm is employed. Fig. 3 shows a plan view of the reproducer, while Fig. 4 shows a section or elevation view of the reproducer.

The frame 27 of the reproducer is substantially flat and of generally circular outline with a raised flange portion 28 at its periphery. The flange portion 28 is shown having four mounting extensions 29 provided with holes for attachment to a panel. To simplify insulation problems, the frame may be of reinforced plastic, although a more conventional metal frame may be used. Spaced over the surface of the frame 27 are a plurality of bosses 30 which extend out from the frame in the same direction as the flange. The bosses 30, each of which provide support for a transducer element 31, to be described below, are arranged in concentric circles about the center of the frame 27 and are so spaced relative to one another that the transducer elements 31 are substantially evenly spaced about each of the concentric circles. In Fig. 3, it may be seen from the dotted outlines that one of the transducer elements is centrally located and that the first concentric ring contains six such transducers while the second concentric ring contains 12 such transducers. The mode of attachment of the transducer elements to the bosses 30 may be by cementing or by riveting or other means.

The reproducer element 31 in the embodiment illustrated in Figs. 3 and 4 comprises a piezoelectric body 32 of slightly spherical configuration having its concave surface oriented away from frame 27. The body 32 is attached at its periphery to a diaphragm 33 preferably by cementing. The diaphragm 33 is shown attached to the flange portion 28 of the frame 27. In proximity to the place of attachment to the frame, the diaphragm 33 is provided with one or more flexural convolutions 34 which facilitate motion of the diaphragm in a direction toward and away from the frame 27. The diaphragm is also provided with a plurality of small openings 35 arranged on each portion of the diaphragm adjacent an individual transducer element for the purpose of providing equalization of the pressure in the space bounded jointly by the diaphragm and the concave surface of the transducer element. The diaphragm may be of a number of known materials. Typically the felted material currently in use for loudspeaker diaphragms may be used. In order to provide pressure relief to the diaphragm as a whole, the frame 27 is also provided with holes 36. Electrical connection to the transducer element 31 is provided by a first electrode 37 coated upon the convex surface of the body 32 and a second electrode 38 coated upon the concave surface of the body 32. The electrodes 37 in each of the transducer elements 31 may then be coupled together to a common bus wire 39 and the electrodes 38 of each of the transducer elements may be coupled together to a common bus wire 40. The attaching leads coupled to the electrodes 37 should generally be of thin flexible materials so as to cause a minimum disturbance in the natural vibration pattern of the transducer elements. In Fig. 4 the electrode 38 is shown connected to a lead 41 which is soldered to the electrode 38 at its center and passes through the center of the body 32, the boss 30 and the frame 27. A number of other modes of connection may, of course, be employed. The busses 39 and 40 are then coupled to a suitable source 42 of signal voltages.

The mode of operation of the embodiment illustrated in Figs. 3 and 4 is similar to the operation of the embodiment shown in Figs. 1 and 2. The application of an audio signal voltage from the source 42 to the bus wires 39 and 40 establishes a potential difference between the electrodes 37 and 38 applied to the surfaces of the body 32 of the individual transducer elements 31. The transducer elements are then caused to flex in a spherical mode in a manner such that the periphery moves in a direction toward and away from the surface of the frame 27 relative to the fixed center portion of the body 32. The slight curvature of the body 32 illustrated permits the full range of flexure of the body 30 to be utilized in achieving a translation of the diaphragm 31 through the full range of flexure without causing the diaphragm to strike the central portion of the body 30. When a flat body 32 is used, the diaphragm can be supported through a spacer. By coupling the diaphragm across each of the transducer elements 31, the total vibration extension of each element may be utilized rather than the average extension which would be utilized if the transducer elements were left uncovered. The extension of the diaphragm to include the area between adjacent transducer elements also increases the effective area of the speaker driving "piston." Since the ability of a sound reproducer to create sound energy is a function of the ratio of the area of the driving piston to the wave length of the sound reproduced, an increase in the area of the piston enhances the low frequency effectiveness of the reproducer.

In the embodiments previously discussed, the higher frequency components of the reproducer are generally confined to a narrow beam. The embodiments illustrated in section in Fig. 5 and in diagram in Fig. 6 indicate ways in which the higher frequency components of the signal voltages may be dispersed.

Figure 5:
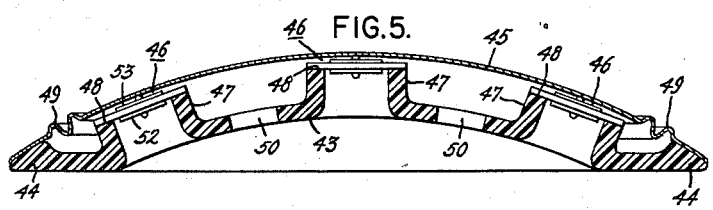
Fig. 5 shows a sound reproducer having a broader angle of high frequency projection.

Referring now to Fig. 5, a generally spherical frame 43 is employed having a peripheral flange 44 which is slightly thickened to provide a support of proper curvature for the diaphragm 45. Individual transducer elements 46 are supported upon the frame 43 in concentric rings in the general manner illustrated in Fig. 3. The transducer elements 46 are provided with bosses 47 of generally cylindrical cross-section, whose heights and orientations are so adjusted that the diaphragm 45 attached to the transducers may be of generally convex spherical shape. Preferably the end surfaces 48 of the bosses are shaped to parallel the surface of the semi-spherical diaphragm 45. The surfaces 48 provide support for individual transducer elements 46 shown attached at their periphery. The diaphragm 47 is coupled to each transducer element 46 at the midpoint of the exposed surface of the transducer element by cementing or other suitable means. The diaphragm 45 as illustrated in Figs. 3 and 4 is also provided with flexure convolutions 49 and is attached to the above mentioned flange portion 44 of the frame. In order to provide pressure equalization within the diaphragm 45 suitable vent holes 50 are employed. Venting holes 51 are also provided in the base of each of the bosses 47. The transducer element 46 is provided with electrodes 52 and 53 coated on its two major surfaces. These electrodes may be suitably connected to an external source of signal voltages not separately shown.

The arrangement in Fig. 5 provides improved dispersion of the higher frequency components, by causing motion of the diaphragm 45 in a generally radial direction. The sound waves produced are then generally transmitted in a direction normal to the surface of the diaphragm.

Figure 6:
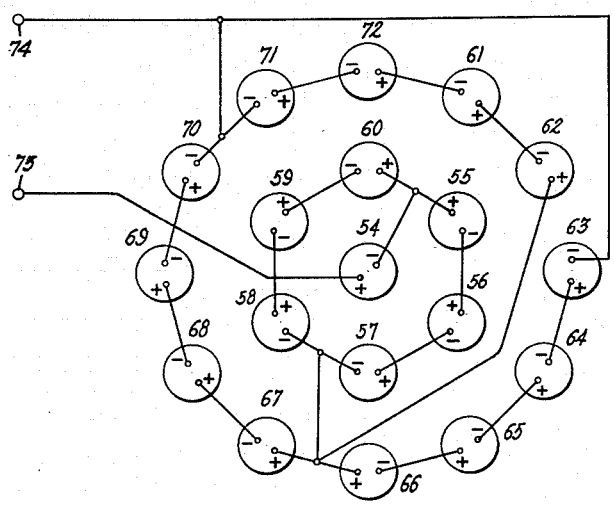
Fig. 6 shows a schematic diagram for energization of individual transducer elements in accordance with the present invention for providing improved high frequency dispersion.

In Fig. 6, a connection arrangement is shown in diagram, for providing substantial high frequency dispersion by appropriate energization of the individual transducer elements. The connections are applicable to the speaker shown in Fig. 3, but the principle may be applied to other configurations as well. An array of concentric rings of the transducers is shown, the centrally disposed transducer element 54, being surrounded by a first ring comprising six transducer elements 55, 56, 57, 58, 59 and 60 recited in clockwise order, and a second ring comprising twelve transducer elements 61, 62, 63, 64, 65, 66, 67, 68, 69, 70, 71 and 72 also recited in clockwise order. These elements are each provided with individual terminals which for convenience will be termed positive, if a source of potential applied to the element with its positive terminal connected at that terminal develops an outward strain in the transducer element. The drawing indicates these terminals by a "+" and "−" sign. Each transducer element should be connected in like phase assuming that the terminal 73 forms the positive input terminal and the terminal 74 forms the negative input terminal one advantageous connection is as follows. The positive terminal 73 is coupled to the positive terminal of the element 54, of which the negative terminal is coupled jointly to the positive terminals of elements 55 and 60. The elements 55 and 60 introduce two paralleled series circuits comprising series connected elements 55, 56 and 57; and 60, 59 and 58 respectively, which are connected in like polarity. The negative terminals of elements 58 and 57 are joined, and are coupled to the positive terminals of elements 67, 66 and 62, which each introduce a series connected circuit: Element 67 is connected in series with 68, 69 and 70; element 66 is connected in series with 65, 64 and 63; and element 62 is connected in parallel with elements 61, 72 and 71. The negative terminals of elements 70, 71 and 63 are joined and coupled to the negative output terminal 74.

Substantial high frequency dispersion is achieved by this method. The centrally placed speaker is less strongly energized, by the above arrangement, than those in the first ring, while those speakers in the outer ring are less strongly energized than those in the inner ring. Had each of the speakers been equally energized, at high frequencies, the usual beam effect would have been observed. The beam effect depends upon the principle of wave cancellation which requires that the phase and amplitude of a wave have predetermined values. If only two sources are considered, the requirement is that the phase be separated one half wave length, and that the amplitudes be alike. Reduction in the amplitude of one of the sources tends to prevent complete cancellation from ever occurring. Likewise, if a continuous radiator, or one having a large number of radiating elements is considered, the reduction in intensity of operation of the drivers further from the center of the periphery of a circular array effectively broadens the beam.

The use of transducer elements operating in a flexural mode of vibration permits the construction of a sound reproducer having an extremely small depth. This depth in certain embodiments may be much less than that achieved by conventional electromagnetic loudspeakers, which require not only depth for the cone and cone supporting structure per se, but also depth for the driving electromagnet. The need for the driving electromagnet is, of course, obviated in the present case and by virtue of the uniform distribution of driving forces over the surface of the transducer, it is unnecessary that a cone type configuration be used to enhance the rigidity of the diaphragm. This is in contrast to the rigidity of form needed in present single point driving systems.

Further advantages may also be utilized by virtue of the fact that the transducer elements may be mounted in relatively simple flat panels, such as molded plastics.

Fig. 7 illustrates a particularly advantageous configuration in which a transducer unit may be formed into a molded sheet in either the manner generally shown in Fig. 1 in which no diaphragm is used or in the manner shown in Fig. 4 in which a diaphragm is used. At 75 is shown a radio cabinet. The tuning knob 76 and volume control knob 77 may be conveniently placed at the sides of the radio cabinet while the tuning dial, not shown, is arranged at the front near the top. The sound reproducer consists of two molded plastic plates 78 and 79, the plate 78 forming the front panel of the cabinet 75 and being generally co-extensive therewith. The panel 78 is provided with hinges 80 at the upper edge for providing a pivoting support for the panel 79. The hinges 80 may suitably provide electrical connection between the sound reproducer panels 78 and 79.

The panels 78 and 79 correspond to the frame elements 11 of Fig. 1, or the plate element 27 of Fig. 4. Panel 78 is provided with a plurality of reproducer elements 81 adapted to project sound outwardly from the surface of the panel. The panel 79 is similarly constructed, having similar reproducer elements 81 arranged on the hidden side thereof. As indicated previously, the construction of the individual panels may take the form indicated in either Figs. 1 or 4. If desired, a diaphragm may be used. In the construction of Fig. 7, one of the main structural frame members form both the structural frame for the reproducer unit and the front panel of the radio cabinet. If additional protection is desired for the transducer elements, the radiating surfaces of the panels 78 and 79 may be further provided with a grill shown at 83.

In operation, the panel 79 may be rotated to an erect position in which the full area of both the panels 78 and 79 may be effectively utilized. The use of the movable panel has the effect of increasing the total area of the sound reproducer available for any particular cabinet size without increasing the dimensions of the receiver when it is not in operation. When the outer panel 79 is in retracted position, the reproducer elements are protected by the back portion of the panel thereby providing an essentially rugged construction.

Fig. 8 shows another arrangement in which a relatively large amount of loudspeaker area may be provided in a radio cabinet of relatively small dimensions. In Fig. 8 the speaker forms an essential part of the receiver cabinet, and if all four side walls of the cabinet are utilized for radiating surfaces, a 360° dispersion is provided of high frequency signal components. The radio receiver is shown at 84, having a cabinet of generally rectangular configuration with preferably its lateral surfaces used for loudspeaker radiation. The radio receiver is provided with a tuning knob 85, tuning dial 86, and volume control knob 87 mounted on the top surface of the cabinet. The sound reproducer portion of the radio receiver may then comprise the four vertically extending walls of the cabinet, thereby providing a wide dispersion of the sound about the radio receiver. The walls may be constructed in the general manner illustrated previously, with the reproducer frame 88 serving also as the front wall of the cabinet. Reproducer elements 89 drive a diaphragm 90, and an acoustically transparent grill 91, such as a metallic screen or perforated fabric is provided so as to protect the assembly.

Fig. 9 illustrates still another advantageous configuration which may be achieved in accordance with the present invention. A plurality of reproducer elements 92 are arranged upon a flat panel 93 and coupled to drive a diaphragm 94. The panel is further provided with a sound-pervious grill 95. The grill 95 may, if desired, take the form of a cloth upon which pictures may be applied. A suitable framing moulding 96, may be used to enclose the reproducer and to provide for its support. The moulding is preferably formed integrally with the panel 93. The speaker may then be mounted upon a wall and connected to a remote source of audio signals by a suitable connecting means 97. The overall reproducer assembly is extremely flat, and may be as little as one half inch in thickness.

While specific embodiments of the invention have been shown and described, it will of course be understood that various modifiications may be devised by those skilled in the art which will embody the principles of the invention and found in the true spirit and scope thereof.

What we claim as new and desire to secure by Letters Patent of the United States is:

1. In combination, a first surface defining member, a stationary second surface defining member spaced from and generally parallel to said first surface defining member, a plurality of piezoelectric transducing plates each having an outer and a center portion, said plates lying generally parallel to said members and being vibrational in a fundamental flexural mode under the influence of applied potentials with the outer portion experiencing the maximum translation with respect to the center portion, said first member being attached to said plates at one of said portions and said stationary member being attached to said plates at the other of said portions, and means for applying electric signals to said transducers so as to cause displacement of said first member.

2. In an electromechanical transducer, the combination comprising a plurality of piezoelectric members each having an outer and a center portion, said members being vibrational under the influence of applied potentials in a fundamental flexural mode with the outer portion experiencing the maximum translation with respect to the center portion, a supporting plate having an area greater than 2½ times the area of any of said piezoelectric members, means for supporting each of said piezoelectric members at a similar one of said portions of said piezoelectric member at points distributed over said area, and a diaphragm attached at points spaced over its surface to each of the other of said portions of said piezoelectric members to cause each of said points of attachment on the surface of the diaphragm to be translated relative to said supporting plate to an extent substantially equal to the maximum flexure of each of said piezoelectric members.

3. In an electromechanical transducer, the combination comprising a plurality of piezoelectric members of ceramic ferro-electric material having a thickness on the order of 0.005 inch, each member having an outer and a center portion, each member being vibrational under the influence of applied potentials in a fundamental flexural mode with the outer portion experiencing the maximum translation with respect to the center portion, a supporting plate having an area greater than 2½ times the area of any of said members, means for supporting each of said piezoelectric members at a similar region of said portions at points distributed over said area to cause the surface of each said piezoelectric member other than said supported portion to experience the simultaneous translation in the same direction.

4. In an electromechanical transducer for the conversion of alternating current potentials lying within a given frequency range into sound vibrations, the combination comprising a plurality of piezoelectric members having an outer and a center portion, said members being non-resonantly responsive to said potentials throughout said frequency range in a fundamental flexural mode with the outer portion experiencing the maximum translation with respect to the center portion, a supporting plate having an area greater than 2½ times the area of any of said members, means for supporting each of said piezoelectric members at a similar one of said portions at points distributed over said area to cause all of the surface of each said piezoelectric member other than said supported portion to experience simultaneous translation in the same direction.

5. In an electromechanical transducer, the combination comprising a plurality of piezoelectric plates, each plate having an outer and a center portion, each plate being vibrational under the influence of applied potentials in a fundamental flexural mode with the outer portion thereof experiencing a maximum translation with respect to the center portion, a supporting member having an area greater than 2½ times the area of any of said piezoelectric members, said supporting member comprising a section of an enclosure wall, means for supporting said piezoelectric plates at one of said portions at points spaced over each of at least two of the surfaces thereof.

6. In an acoustic radiator, a peripheral member embracing an aperture and generally defining a plane, a back support associated with said peripheral member, a stretched membranous member resiliently supported from said peripheral member, and a plurality of piezoelectric transducers each having respectively an outer and a center portion, said members being vibrational under the influence of applied potentials in a fundamental flexural mode with the outer portion thereof experiencing the maximum translation with respect to the center portion, said piezoelectric transducers being disposed within said aperture and operatively connected at one of said portions to said back support and at the other of said portions to said membranous member.

7. In an acoustic radiator, a peripheral member embracing an aperture and generally defining a plane, a back support associated with said peripheral member, a stretched membranous member resiliently supported from said peripheral member, and a plurality of piezoelectric plates of ceramic ferro-electric material, each member having an outer and a center portion, each member being vibrational under the influence of applied potentials in a fundamental flexural mode with the outer portion experiencing the maximum translation with respect to the center portion, said plate being disposed within said aperture and operatively connected at one of said portions to said back support and to the other of said portions to said membranous member.

8. In an electromechanical transducer, the combination comprising a plurality of piezoelectric members each having respectively an outer and a center portion, said members being vibrational under the influence of applied potentials in a fundamental flexural mode with the outer portion experiencing the maximum translation with respect to the center portion, a supporting member having an area greater than 2½ times the area of any of said piezoelectric members, said area being of generally convex configuration, and means for supporting each of said piezoelectric members at a similar one of said portions at points distributed over said area.

9. In an electromechanical transducer, the combination comprising a plurality of piezoelectric members each having respectively an outer and a center portion, said members being vibrational under the influence of applied potentials in a fundamental flexural mode with the outer portion experiencing the maximum translation with respect to the center portion, a supporting member having an area greater than 2½ times the area of any of said piezoelectric members, said area being of generally convex configuration, means for supporting each of said piezoelectric members at a similar one of said portions at points distributed over said area, and a diaphragm attached at points spaced over its surface to each of the other of said portions.

10. In an electromechanical transducer, the combination comprising a plurality of piezoelectric members each having respectively an outer and a center portion, said members being vibrational under the influence of applied potentials in a fundamental flexural mode with the outer portion experiencing the maximum translation with respect to the center portion, a supporting plate having an area greater than 2½ times the area of any of said piezoelectric members, means for supporting each of said piezoelectric members at a similar one of said portions at points distributed over said area, a diaphragm attached at points spaced over its surface to each of the other of said portions, and means for applying said potentials to said piezoelectric members in greater intensity to members near the center of said area and in lesser intensity to the members near the periphery thereof.

11. In an electromechanical transducer, a combination comprising a plurality of piezoelectric members of ceramic ferro-electric material wherein the polarization varies through the thickness of the plate and contains a component tangential to the surface thereof so that upon application of potentials to said plate, said plate vibrates in a fundametal flexural mode, a supporting plate having an area greater than 2½ times the area of any of said members, means for supporting each of said piezoelectric members at a similar one of said portions at points distributed over said area.

References Cited in the file of this patent

UNITED STATES PATENTS

| | | |
|---|---|---|
| 2,306,909 | Sykes | Dec. 29, 1942 |
| 2,411,146 | Clement | Nov. 19, 1946 |
| 2,487,962 | Arndt | Nov. 15, 1949 |
| 2,518,331 | Kalin | Aug. 8, 1950 |
| 2,579,162 | Veneklasen | Dec. 18, 1951 |